United States Patent [19]

Farnsworth

[11] 3,924,158

[45] Dec. 2, 1975

[54] ELECTRONIC OVERLOAD PROTECTION DEVICE

[75] Inventor: Robert P. Farnsworth, Los Angeles, Calif.

[73] Assignee: Hughes Aircraft Company, Culver City, Calif.

[22] Filed: Oct. 24, 1974

[21] Appl. No.: 517,558

[52] U.S. Cl. ................................ 317/31; 317/33 JR

[51] Int. Cl.² ................................ 323 9; H02H 3/24

[58] Field of Search ......... 317/22, 31, 33 JR; 323/9, 323/22 T; 307/202

[56] References Cited

UNITED STATES PATENTS

| | | | |
|---|---|---|---|
| 2,922,945 | 1/1960 | Norris et al. | 317/33 JR |
| 3,399,338 | 8/1968 | Burgert et al. | 323/9 |
| 3,509,448 | 4/1970 | Bland | 323/9 |
| 3,543,091 | 11/1970 | Marek | 317/22 |
| 3,831,081 | 8/1974 | Weiss | 323/22 T |
| 3,886,410 | 5/1975 | Seer, Jr. | 317/33 JR X |

*Primary Examiner*—J. D. Miller
*Assistant Examiner*—Harry E. Moose, Jr.
*Attorney, Agent, or Firm*—W. H. MacAllister; Lawrence V. Link, Jr.

[57] ABSTRACT

An overload protection device comprising a first current amplifier having an output current path coupled between a source of DC potential and an electrical load; a second current amplifier coupled to the first current amplifier and to the load such that when the load impedance is above a preselected value, the gain of the circuit loop comprising the two amplifiers regenerates to cause the first current amplifier to be driven to its saturated "on", i.e., full load current capability, condition. When the load impedance decreases below the preselected value the gain of the circuit loop degenerates so that the first current amplifier is biased "off" and the load current is reduced to near zero. Removal of the overload condition allows the automatic restoration of full load current capability.

4 Claims, 7 Drawing Figures

ELECTRONIC OVERLOAD PROTECTION DEVICE

BACKGROUND OF THE INVENTION

This invention relates generally to overload protection devices and particularly to such devices which have low internal power dissipation and which substantially interrupt the current to the load during overload conditions.

In many applications, such as providing a DC logic signal across equipment interface zones, protection is required to insure that the line driving circuits are not damaged if overloaded, e.g. if shorted.

One well known overload protection technique involves providing limited "constant current" base drive to an output transistor which drives the load. This method provides current limiting, however, power dissipation during overload conditions is high. Preferably, overload protection devices should include a "foldback" type of turnoff under overload conditions, i.e., when the load impedance decreases below a preselected level only a small fraction of full load current is supplied to the load.

A feedback circuit arrangement which provides some "foldback" under heavy overload conditions and which automatically recovers upon removal of the overload is described at pages 35 and 36 of the Digest of Technical Papers of the 1958 Transistor and Solid State Circuits Conference held at the University of Pennsylvania. However, this circuit allows considerable power dissipation under slight or moderate overload conditions.

The circuits disclosed in U.S. Pat. No. 3,076,135 avoids the shortcomings of the two above noted prior art techniques; however, these circuits are relatively complex and therefore are not totally applicable to applications such as simple line drivers, for example.

SUMMARY OF THE INVENTION

One object of the subject invention is to provide a simple line driver circuit having overload protection, low internal power dissipation and the capability of providing a relatively high load current.

A further object of the invention is to provide an improved overload protection circuit which supplies only a very small percentage of normal full load current to the load during overload conditions.

Another object of the invention is to provide an improved overload protection circuit which has low internal power dissipation, which is capable of providing relatively high load currents, which supplies only a very small percentage of normal load current to the load during overload conditions and which automatically recovers to full load current capability when the overload condition is removed.

Still another object of the invention is to provide an improved overload protection device which is particularly suited to monolithic integrated circuit implementation.

Briefly the subject invention comprises a first current amplifier having its output current path coupled between a source of DC potential and an electrical load. A second current amplifier is coupled to the first current amplifier circuit and to the load so that when the products of the current gains of the circuit loop (i.e., the two current amplifier circuits) exceeds one, the loop regenerates and the first current amplifier is driven to its saturated on condition. At least one of the two current amplifiers is coupled to the load such that its current gain decreases as the impedance of the load decreases. When the load impedance decreases below a preselected value the loop's gain falls below one and the loop degenerates, turns the first current amplifier off, and thereby decreases the load current to near zero. Removal of the overload condition allows the loop's gain to again exceed one and full load current capability is automatically restored. Due to the regenerative arrangement of the two current amplifiers, high power dissipation within the device is avoided, i.e. the device rapidly switches between a first operating mode wherein the current therethrough is high but the voltage thereacross is low, and a second operating mode wherein the voltage thereacross is high but the current therethrough is low.

One embodiment of the invention further comprises a control circuit coupled to one of said current amplifiers such that the loop's gain may be selectively held to less than one, i.e., the load current is interrupted.

A second embodiment of the invention relates to a configuration thereof whereby overload protection in power supplies is provided by incorporation of an overload circuit in accordance with the invention, in the output circuit of the power supply.

The subject invention exhibits the following advantages over prior art techniques; it is simpler to implement; it is more efficient in terms of less power loss under both normal and overload conditions; and it is more readily adaptable to monolithic circuit implementation.

BRIEF DESCRIPTION OF THE DRAWINGS

The novel features which are characteristic of the invention both as to its organization and method of operation, together with further objects and advantages thereof, would be better understood from the following description considered in conjunction with the accompanying drawings in which like characters refer to like parts and in which.

DESCRIPTION OF THE PREFERRED EMBODIMENTS

Figure 1:
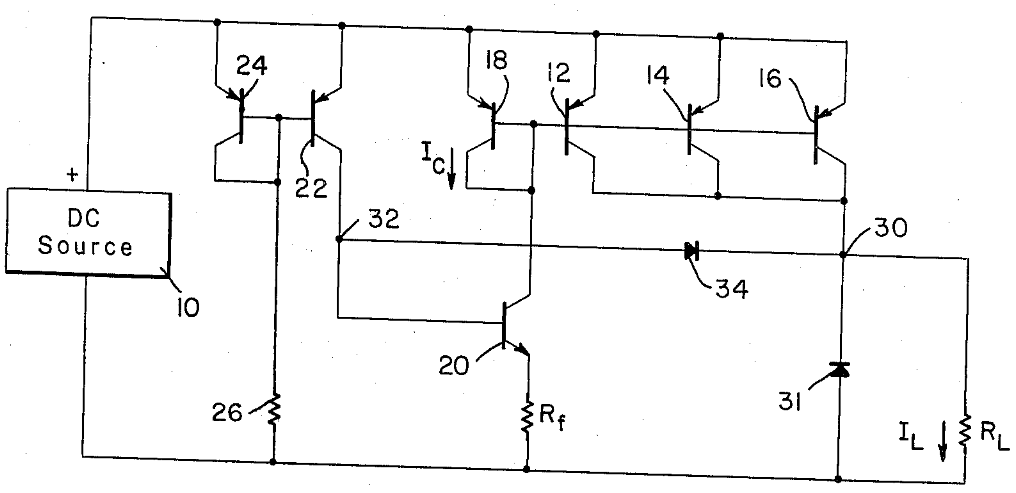
FIG. 1 is a schematic and block diagram of one embodiment of an electronic overload protection device in accordance with the invention.

In the embodiment of FIG. 1, the load current $I_L$ is applied from a DC source 10 to a load $R_L$ through transistors 12, 14, and 16. The arrangement of transistors 12, 14, 16, and 18 is sometimes referred to as a "current mirror" inasmuch as since the base-emitter voltage of each of these transistors is equal, the maximum collector current of each of these transistors will also be approximately equal. This approximation is improved if the transistors are on the same chip in integrated circuit implementations. Hence, if the collector current in transistor 18 is $I_C$ then the maximum load current provided by transistors 12, 14, and 16 is approximately $3I_C$. Transistors 12, 14, 16, and 18 function as a current amplifier having broad bandwidth and current gain very nearly independent of the transistors' characteristics.

The current $I_C$ is controlled by transistor 20 whose base current is supplied by a current mirror arrangement comprising transistors 22 and 24, a resistor 26, coupled to the collector of transistor 24; and a resistor $R_f$ is in series with the emitter of transistor 20.

As will be explained subsequently, the circuit's parameters are selected such that under normal load conditions transistors 12, 14, 16 and 20 are in their saturated on condition. Since the maximum load current is limited to $3I_C$, as the impedance of load $R_L$ decreases below a preselected value, the voltage at a junction point 30 decreases below the voltage of a junction point 32 such that diode 34 conducts. This reduces the base drive to transistor 20 which in turn reduces the value $I_C$ and therefore the value of load current $3I_C$ available to the load. This just described sequence is regenerative and results in shutting off the current to the load. Diode 31 removes negative voltages spikes such as could result from reactive loads.

Figure 6:
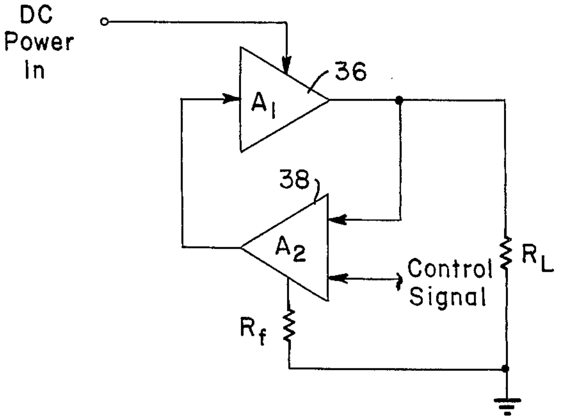
FIG. 6 is a block and schematic diagram of the circuit of FIG. 5 which is useful for explaining the theory of operation of the invention.

The operation of the circuit in FIG. 1 may be better understood by referring to FIG. 6 wherein current amplifier 36 corresponds to the circuits associated with transistors 12, 14, 16, and 18 in FIG. 1; and current amplifier 38 corresponds to the circuits associated with transistor 20, and resistors $R_f$ and $R_L$ in FIG. 1. In FIG. 6, the gain of amplifiers 36, and 38 are defined as $A_1$ and $A_2$ respectively; where $$A_2 = K\ \frac{R_L}{R_f}.$$

The loop comprising current amplifiers 36 and 38 has a gain value greater than one (regenerates to the saturated on condition) when $$A_1 \cdot K\ \frac{R_L}{R_f} > 1.$$

Thus for $$R_L > \frac{R_f}{KA_1}$$

the circuit remains on and provides only the drop of saturated transistors between source 10 and load $R_L$. As $R_L$ is decreased (i.e., towards overload), and becomes less than $(R_f/KA_1)$ the circuit shuts off and the load current drops to near zero. Removal of the overload allows the loop gain to exceed one and the amplifier $A_1$ regenerates to its saturated on condition.

Figure 7:
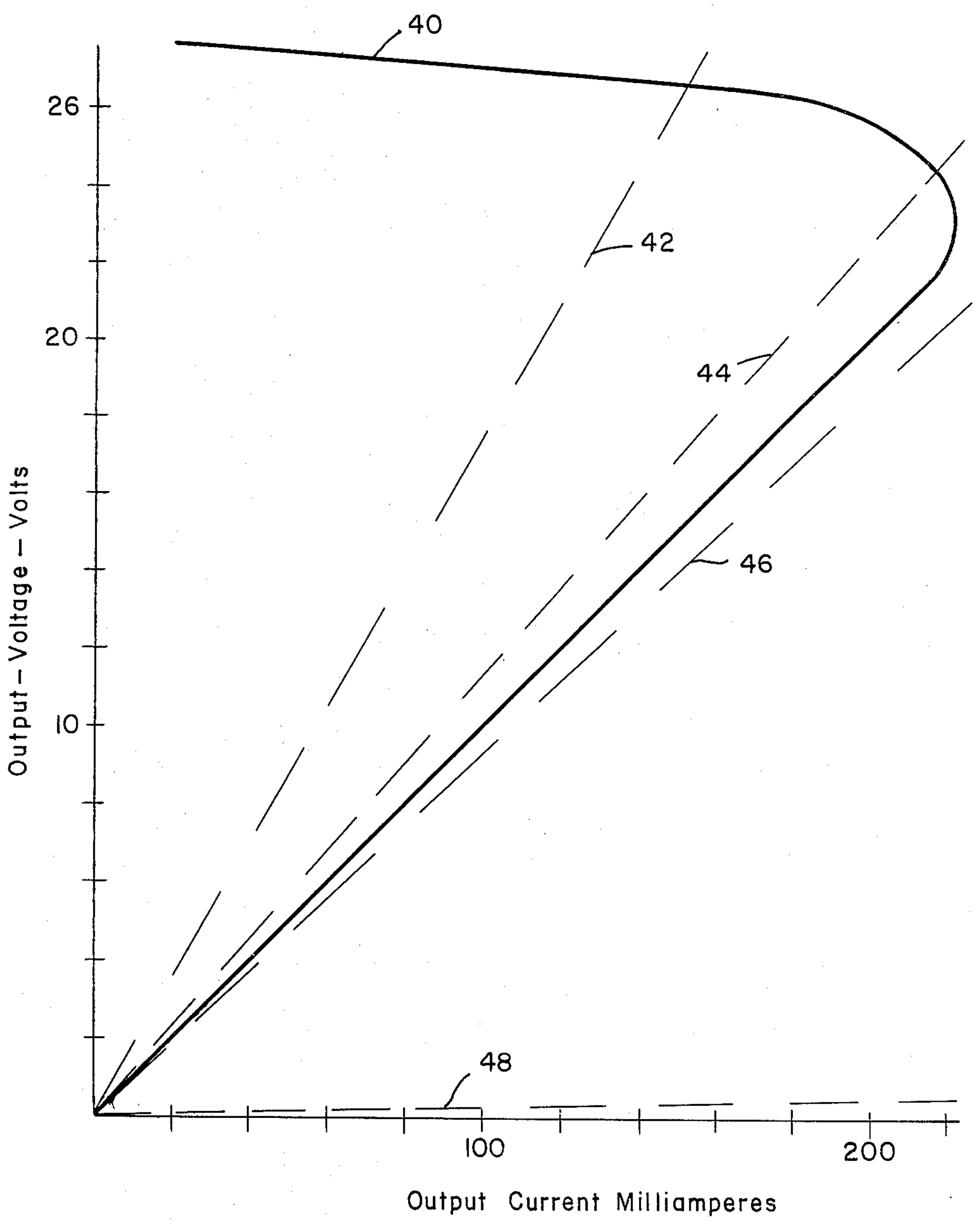
FIG. 7 is a graph of output voltage versus output current and is useful for explaining the foldback type operation of circuits in accordance with the invention.

The characteristics of the subject invention whereby the load current is reduced to near zero under overload conditions and automatically recovers when the overload is removed are illustrated in FIG. 7. As there shown, curve 40 depicts the output voltage versus output current characteristics of an overload protection circuit in accordance with the invention. Load lines 42, 44, and 46 represent medium, full design and overload conditions, respectively. For example, a medium load could be 10 ohms, the full design load 5 ohms and an overload less than 4-½ ohms. It is noted that in the above example the overload condition is slightly less than the full design load so as to allow a safety margin. Still referring to FIG. 7, for the medium load condition represented by line 42, the output voltage and current are as indicated by the point of intersection of curve 40 and load line 42. For the full design load condition, the output voltage and current are as indicated by the point of intersection of the curve 40 and load line 44. For the slight overload case of load line 46, the output voltage and current are substantially zero; the same as the short circuit case depicted by the load line 48. It is noted that the characteristics of FIG. 7 correspond to the circuit type of FIG. 5 which does not have parralel load current drivers, such as 12, 14, and 16 of FIG. 1; and the voltage drop shown in FIG. 7 during nonoverload conditions is greater than would be encountered for the configuration of FIG. 1.

Figure 5:
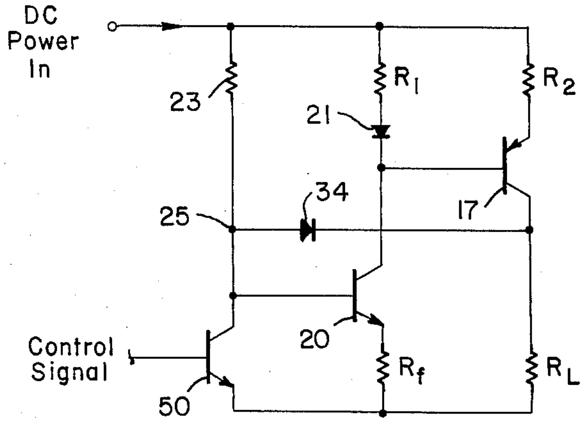
FIG. 5 is a simplified configuration of the circuit type of FIG. 2.

In FIG. 5, the load circuit $I_L$ is normally supplied through transistor 17, the base drive to which is coupled through a resistor $R_1$ and a diode 21. Diode 21 is used to compensate, i.e., track out, the base to emitter voltage drop of transistor 17. The circuit associated with transistor 17 in FIG. 5 corresponds to current amplifier 36 in FIG. 6; and the circuit associated with transistor 20 in FIG. 5 corresponds to current amplifier 38 in FIG. 6. In the circuit of FIG. 5,

$$A_1 = \frac{R_1}{R_2}\ ;\ A_2 = \frac{R_L}{R_f}$$

and the minimum load $$R_{Lmin} = \frac{R_f R_2}{R_1}.$$

In the embodiment of FIG. 5, transistor 50 allows on-off control of the load current, i.e., a positive signal applied to the base terminal of transistor 50 turns transistor 20 off which in turn biases transistor 17 off and thereby interrupts the current to the load.

Figure 2:
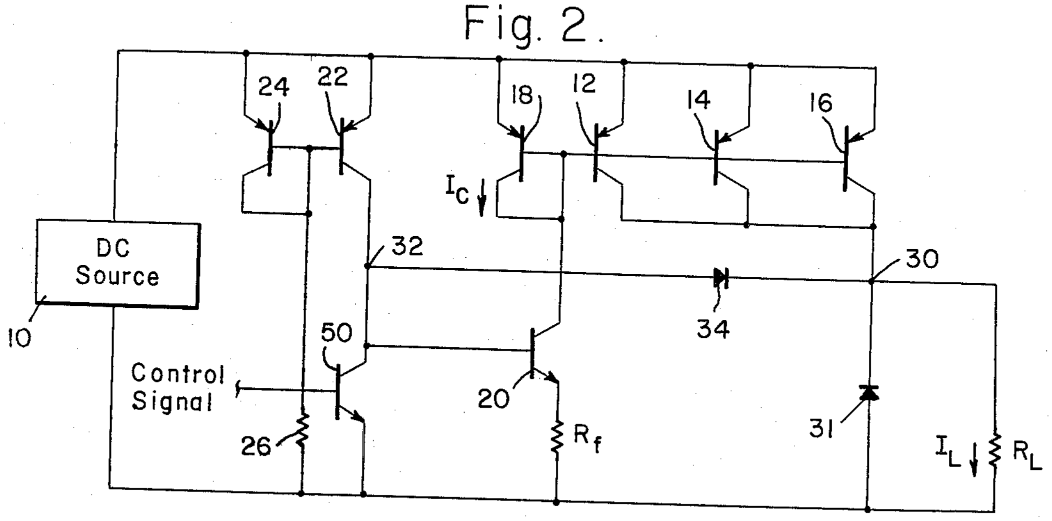
FIG. 2 is a schematic and block diagram of a second embodiment of the invention which includes a control circuit for selectively turning the load current on and off and in which the control signal and the load voltage are of opposite polarities.

The embodiment of FIG. 2 is structurally and functionally identical to that of FIG. 1 with the addition of on-off control of the load current provided by transistor 50. In the circuit of FIG. 2, a positive control voltage applied to the base terminal of transistor 50 turns off the load current.

Figure 3:
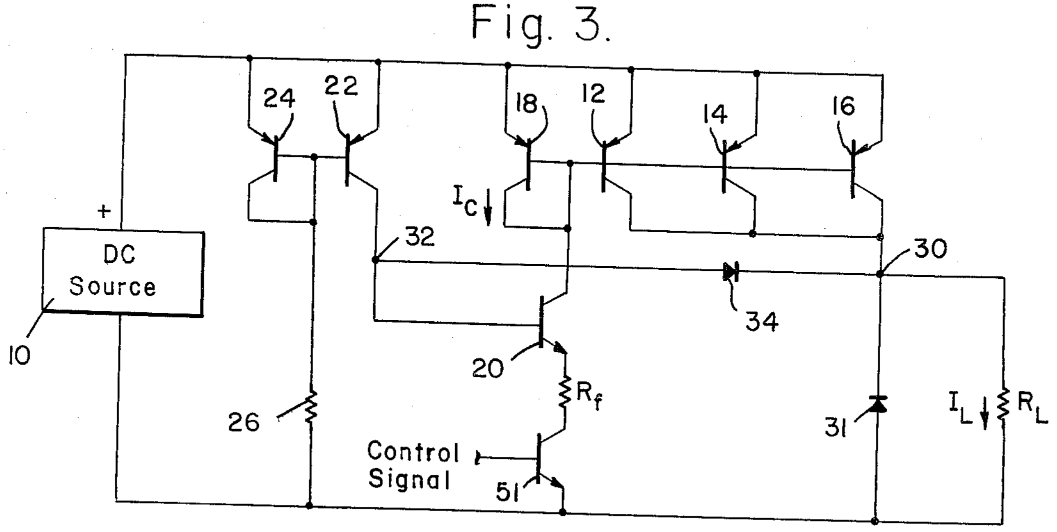
FIG. 3 is a schematic and block diagram of an embodiment of the invention which includes a control circuit for selectively turning the load current on and off and in which the control signal and the load voltage are of the same polarities.

The embodiment of FIG. 3 is structurally and functionally identical to that of FIG. 1 with the addition of on-off control of the load current provided by transistor 51. For the circuit of FIG. 3, a negative control voltage (or the removal of base drive) to the base terminal of transistor 51 turns off the load current.

Figure 4:
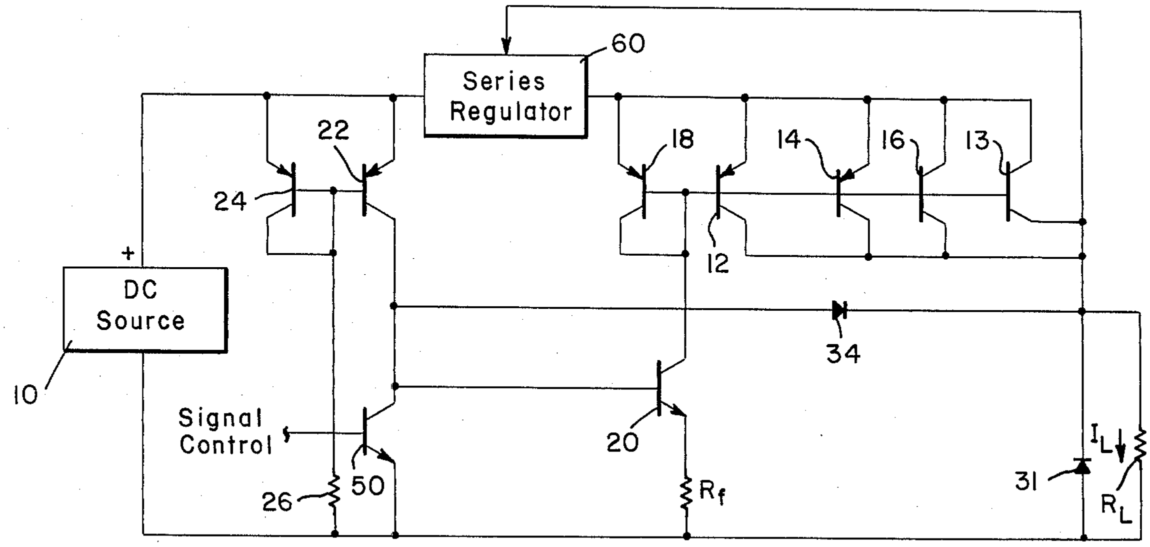
FIG. 4 is a schematic and block diagram of an overload protection circuit in accordance with the invention, incorporated in the output circuit of a DC power supply.

In the embodiment of FIG. 4, a reliable power supply with overload protection is achieved by a series regulator 60 between the positive terminal of DC source 10 and the emitters of transistors 18, 12, 14, 16 and 13. The voltage for controlling the series regulator is sensed across the load. Also in FIG. 4 the load is supplied by four transistors in parallel to illustrate the point that the voltage drop across the protection circuit under normal load conditions may be as small as desired by merely increasing the number of parallel driving transistors. It should also be noted that the N parallel devices can be replaced with a single device having N times the effective active area.

It is noted that in all herein illustrated embodiments of the invention the value of the overload impedance is a function of resistor $R_f$, which resistor may be built into the device for a fixed overload impedance value or may be made external to the protection circuit itself for providing an adjustable overload value.

Thus having described a new and improved electronic overload protection device what is claimed is:

1. An overload protection device adapted for coupling a direct current voltage source to a load so that load current is provided whenever the impedance of the load is greater than a preselected value and the load current is substantially interrupted whenever the impedance of the load is less than the preselected value, said device comprising:

a first current amplifier having an input signal terminal, and an output current path coupled between the voltage source and the load, said first current amplifier being responsive to signals applied to its input signal terminal for controlling the impedance of its output path from a minimum value to a maximum value, and including a plurality of transistors having their respective collector, emitter and base terminals interconnected and with the parallel combination of their collector-emitter current paths comprising said output current path, and another transistor which has its collector and base terminals connected to the interconnected base terminals of said plurality of transistors and to the input signal terminal of said first current amplifier, and its emitter terminal connected to the interconnected emitter terminals of said plurality of transistors; and a second current amplifier having an input terminal coupled to said load such that its current gain is a function of the impedance of the load and having an output terminal coupled to the input signal terminal of said first current amplifier, and including means for controlling the collector current in said another transistor such that said plurality of transistors are biased into their saturated on condition when said load impedance is greater than said preselected value and are biased off when said load impedance is less than said preselected value.

2. The overload protection device of claim 1 further comprising gating circuit means responsive to an applied control signal and coupled to said second current amplifier such that upon the application of a control signal the current gain of said second current amplifier is reduced to such a value that said first current amplifier is biased off.

3. The overload protection device of claim 1 wherein said second current amplifier includes a transistor current amplifier having a resistance element coupled in its emitter-collector current path such that the current gain of said second transistor current amplifier is a function of said resistance element.

4. The overload protection device of claim 1 wherein the input terminal of said second current amplifier is coupled to said load through a diode.

* * * * *